United States Patent [19]

Peditto et al.

[11] 4,212,752

[45] Jul. 15, 1980

[54] IMPROVED PROCESS FOR THE PRODUCTION OF AN ADDITIVE FOR LUBRICATING OILS AND RELATED PRODUCT

[75] Inventors: Andrea Peditto, Turin; Franco Fossati, Robassomero; Vincenzo Petrillo, Cirie'; Paolo Peri, Rivoli, all of Italy; Ielena A. Ivanova, Moscow, U.S.S.R.; Aleksandr I. Levin, Moscow, U.S.S.R.; Aleksandr A. Fufaiev, Moscow, U.S.S.R.; Vicktor M. Shkolnikov, Moscow, U.S.S.R.

[73] Assignees: Liquichimica Robassomero S.p.A., Milan, Italy; Vsesoiuznis Nauchij issledovatelskj Institut Po Pererabotke Nefti Vniinp, Moscow, U.S.S.R.

[21] Appl. No.: 883,664

[22] Filed: Mar. 6, 1978

Related U.S. Application Data

[63] Continuation of Ser. No. 704,074, Jul. 9, 1976, abandoned.

[30] Foreign Application Priority Data

Jul. 14, 1975 [IT] Italy .............................. 25386 A/75

[51] Int. Cl.$^2$ .............................................. C10M 1/54
[52] U.S. Cl. ................................................... 252/42.7
[58] Field of Search ........................................ 252/42.7

[56] References Cited

U.S. PATENT DOCUMENTS

| 2,971,014 | 2/1961 | Mastin | 252/42.7 |
| 3,372,118 | 3/1968 | Rense | 252/42.7 |
| 3,755,170 | 8/1973 | Rogers et al. | 252/42.7 |

*Primary Examiner*—Andrew Metz
*Attorney, Agent, or Firm*—Cushman, Darby & Cushman

[57] ABSTRACT

A detergent additive for lubricating oils is prepared by reacting an alkylphenolsulfide with an oxide or hydroxide of a earth-alkali metal and carbonating the reaction product with carbon dioxide, the reaction being carried out in the presence of a promoter, selected in the class of the organic nitrogen compounds, and possibly of a co-promoter; the temperature and the time of the reaction are depending on whether the co-promoter is present. The resulting product shows improved detergency and flow-ability properties.

13 Claims, No Drawings

IMPROVED PROCESS FOR THE PRODUCTION OF AN ADDITIVE FOR LUBRICATING OILS AND RELATED PRODUCT

This is a continuation, of application Ser. No. 704,074 filed July 9, 1976, and now abandoned.

The present invention relates to a detergent additive for lubricating oils and to the related manufacturing process.

Detergent additives for lubricating oils having phenolic base are already known, which are endowed with particular properties of alkali reserve for the neutralization of the acid substances which are formed in the lubricant or polluting it during the operation.

It is already known the use of detergent additives based on sulfurized alkylphenols, neutralized with earth-alkali metal, mainly barium or calcium, which contain, if any, an alkali reserve in carbonate or hydrate form, particularly in the lubricants for diesel engines: the basic material for the preparation of these additives is an alkylphenol, usually $C_8$-$C_{12}$ with side chains, which is variously sulfurized with elementar sulfur or derivatives thereof, before or after the neutralization with an earth-alkali metal, which sometimes is subsequently carbonated with $CO_2$, either alone or in admixture with other gases, in the presence of an excess of the oxide or hydrate of the metal as well as of one or more promoters.

The main purpose of the present invention resides in providing a detergent additive of the above defined type, having improved properties of detergency and flowability.

Another as well important purpose of the present invention is that of providing an improved process for the preparation of the above additive.

These purposes are achieved through a process of the type in which an alkylphenolsulfide having the formula:

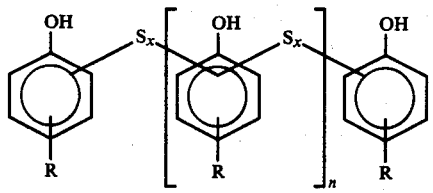

wherein R represents a $C_8$-$C_{12}$ alkyl radical, x has an average value of between 1 and 2, preferably of between 1 and 1.5, and n is 0 or 1, is reacted with an oxygen bearing compound of an earth-alkali metal and carbonated with carbon dioxide, the reaction water being then distilled up to refluxing of the possible solvent, the reaction product is filtered and then distilled from the solvent, characterized in that the reaction between the alkylphenolsulfide and the oxygen bearing compound of the earth-alkali metal and/or the carbonating reaction is carried out by adding to the reaction mixture 0.1 to 20% by weight, referred to the weight of the final product, of a promoter comprising a mono- or polyfunctional organic nitrogen derivative, the reaction being carried out in an aromatic, aliphatic or cyclic, hydrocarbon solvent, containing 6 to 12 carbon atoms.

According to the preferred embodiment of the above defined process, the promoter is added at the carbonating step and in the presence of a $Ca(OH)_2$ excess, the promoter preferably consisting of an aminoalcohol, the reaction temperature being in the range of 85°–105° C., preferably 95°–98° C., and the reaction time being in the range of 1–20 hours, preferably 4–10 hours.

According to another embodiment of the process of the present invention, a co-promoter is added together with the promoter, the former being selected amongst the light alcohols, preferably methanol, the reaction being in this case carried out at a temperature of between 30° to 70° C., preferably 50°–60° C. and the reaction time being 0.5 to 10 hours, preferably 2 to 5 hours, the co-promoter being then removed together with the reaction water.

Thus, by the process of the present invention, the carbonating reaction can be carried out at several temperatures, in the presence or absence of the co-promoter, which has the purpose of accelerating the reaction, and the improved properties of detergency and flowability of the final product are anyhow obtained.

Preferably, as the oxygen bearing compound of the earth-alkali metal, calcium oxide or hydroxide is used.

In both cases the neutralization of the alkylphenolsulfide, as a matter of fact, takes place simultaneously with respect to the carbonation, but it can be carried out separately, before the carbonation, through the addition of a lesser amount of $Ca(OH)_2$ before the carbonation and of a greater amount of $Ca(OH)_2$ after the neutralization, simultaneously to or before the $CO_2$ addition.

In both cases the metal oxide can be used instead of the hydroxide, the reaction being possibly started by small amounts of water.

During the carbonation process the thus formed $CaCO_3$ takes the form of an exceedingly fine colloidal dispersion together with CaO, $Ca(OH)_2$ and other basic compounds, which are not well determined and possibly correspond to mixed suspensions of carbonates and hydrated oxides: in this phase an improvement due to the promoter is already noted, since the reaction takes place more easily, possibly owing to an intermediate (promoter—$CO_2$) which is the species which thereafter in fact reacts with the calcium hydroxide to form $CaCO_3$; in the event of a co-promoter is also used, particularly methanol, calcium-methanol complexes are probably also formed, which react with the promoter—$CO_2$ complex, whereby the greater reaction rate in the presence of alcohols and at low temperature is explained.

More difficult seems to explain the viscodepressant effect of the nitrogen promoter; the explanation is seemingly to be found in the structure taken by the active substance, namely the alkylphenol neutralized in the presence of aminoderivatives, which structure can be different with respect to the possible polymolecular arrangements and with a different polar center, namely an amino center instead of a metal center; moreoever the possibility of metal to amine interactions in form of secondary chemical bonds can not be excluded as the primary mechanism of the different polar center.

As the amino promoters there are useful compounds comprising one or more nitrogen functions, such as primary and secondary alkylamines having a number of carbon atoms of between 1 and 20, polyalkylenpolyamines, for instance diethylentriamine (DETA), triethylentetramine (TETA) and tetraethylenpentamine (TEPA), having a number of nitrogen atoms of between 2 and 6, the alkylene radicals having 2 to 5 carbon atoms, either alone or in admixture, aminoacids having 2 to 20 or 2 to 10 carbon atoms, and particularly aminoalcohols, preferably polyalkanolamines having a number of carbon atoms of between 2 and 12, either alone or in admixture, as well as mono- or poly-amides or imides containing alkyl residues having a number of carbon atoms of between 1 and 100.

The following examples, having no limiting meaning, illustrate the invention:

EXAMPLE 1

A reactor was charged with 445.5 grams of nonane, 182.5 g. of a dodecylphenolsulfide having a structure corresponding to the formula (1) wherein:
R=a $C_{12}$ hydrocarbon chain
X=1.2 on the average
8.9 g. of diethanolamine, 8.5 g. of water, 146.7 g. of $Ca(OH)_2$, and the mixture was carbonated with 40.8 g. of $CO_2$ at the temperature of 95° C. At the end 167 g. of a lubricating oil having a viscosity of 150 SSU at 100° F. were added and the mixture was filtered. After removal of the solvent and of the reaction water a product was obtained containing 8.9% calcium, 3.6% sulfur and having a viscosity of 150 cst. at 210° F.

EXAMPLE 2

324.6 g. of toluene, 175 g. of a dodecylphenolsulfide like that of the Example 1, 8.7 g. of diethanolamine, 183.7 g. of methanol and 105 g. of $Ca(OH)_2$ were charged in a reactor. The mixture was carbonated with 28 g. of $CO_2$. At the end of the carbonation 175 g. of a lubricating oil having a viscosity of 150 SSU at 100° F. were added, and the mixture was heated up to evaporation of the methanol and of the reaction water. The product was filtered, and, on removal of the solvent, had a calcium content of 8.22%, and a sulfur content of 3.71%, the viscosity being 160 cst. at 210° F.

EXAMPLE 3

The method of the Example 1 was repeated, except that an alkylphenolsulfide of formula (1) wherein:
R=80% of a $C_{12}$ hydrocarbon chain and 20% of a $C_9$ hydrocarbon chain, and
x=1
was used, and cumene was used as the solvent and the oleic amide of TEPA was the promoter.

A product was obtained containing 8.65 calcium, 3.34% sulfur, and having a viscosity of 145 cst. at 210° F.

EXAMPLE 4

The Example 3 was repeated, by using diethanolamine in the amount of 4 g. as the promoter. A product was obtained containing 8.25% calcium, and 3.39% sulfur, the viscosity being 95 cst. at 210° C.

EXAMPLE 5

The Example 1 was repeated with an alkylphenosulfide corresponding to the formula (1), wherein R=80% of a $C_{12}$ hydrocarbon chain and 20% of a $C_9$ hydrocarbon chain, and x=1.

A product was obtained containing 8.4% calcium and 3.2% sulfur, the viscosity being 110 cst. at 210°0 F.

EXAMPLE 6

The Example 1 was repeated with a dodecylphenolsulfide corresponding to the formula (1) wherein x=1.5 on the average.

A product was obtained containing 8.4% calcium and 3.4% sulfur, the viscosity being 87 cst. at 210° F.

The products prepared according to the Examples 3, 4, 5 and 6 were subjected to some evaluation tests, in comparison with a commercially available product containing 9.2% calcium, 3.7% sulfur and having a viscosity of 235 cst. at 210° F., the concentration in the lubricating oil being the same, and in comparison with the same oil without additives.

The detergency index D. I., as a function of the efficiency in removing carbon from metal surfaces and in preventing deposits from being formed, as well as the amount of sludge formed due to the oxidation of the lubricant after 5 hours at 200° F. in the presence of lead, copper and iron were determined with the following results:

|  | Oil without additives | Commercial product | Ex. 3 | Ex. 4 | Ex. 5 | Ex. 6 |
| --- | --- | --- | --- | --- | --- | --- |
| D. I. | 0 | 10.8 | 24.4 | 37.4 | 46.5 | 58.8 |
| sludges % | 12 | 0.9 | 0.6 | 0 | 0 | 0 |

We claim:

1. In a process for the preparation of detergent additives for lubricating oils, of the type in which an alkylphenolsulfide having the formula:

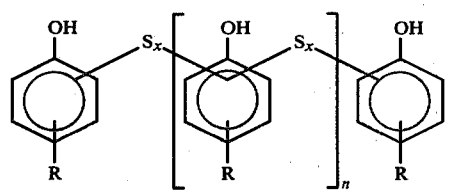

wherein R represents a $C_8$–$C_{12}$ alkyl radical, x has an average Value of between 1 and 2, and n is 0 or 1, is reacted with calcium metal oxide or hydroxide and carbonated with carbon dioxide, the reaction water being then distilled up to refluxing of the solvent, and the reaction product is filtered and then separated from the reaction solvent, the improvement comprising carrying out at least one of (1) the neutralization reaction between said alkylphenolsulfide and the calcium oxide or hydroxide and (2) the carbonating reaction by adding to the mixture 0.1–20% by weight, referred to the weight of the final product, of a promoter comprising a mono- or polyfunctional organic nitrogen derivative which is selected form the group consisting of primary and secondary alkylamines having 1 to 20 carbon atoms, polyalkyleneamines having 2 to 6 nitrogen atoms and the alkylene radical of which has 2 to 5 carbon atoms, aminoacids having 2 to 20 carbon atoms, aminoalcohols and polyalkanolamines having 2 to 12 carbon atoms and oleic acid amide of tetroethyleneysentamine, the reaction being effected in a hydrocarbon solvent containing 6 to 12 carbon atoms.

2. A process according to claim 1, wherein the promoter is added at the beginning of the carbonating reaction, the reaction temperature is between 85° C. and 105° C. and the reaction time is between 1 and 20 hours.

3. A process according to the claim 1, characterized in that said solvent is an aliphatic, aromatic or cyclic hydrocarbon, having 8 to 12 carbon atoms.

4. A process according to the claim 1, characterized in that besides the promoter methanol is added as a copromoter the reaction being carried out at a temperature of 30° to 70° C. and for a time of 0.5 to 10 hours.

5. A process according to the claim 4, characterized in that said carbonating reaction and said neutralization reaction are simultaneous and take place in the presence of calcium oxide or hydroxide, the reaction temperature being 50°-60° C. and the reaction time being 2-5 hours.

6. A process according to the claim 4, characterized in that said comethanol is removed from the reaction mixture during the distillation of the reaction water.

7. A process according to claim 1, wherein the promoter is an aminoalcohol or a polyalkanolamine.

8. A process according to claim 7 wherein the promoter is diethanolamine.

9. A process according to claim 1 wherein the promotor is a polyalkyleneamine or oleic acid amide of tetraethylenepentamine.

10. A process according to claim 9, wherein the promoter is oleic acid amide of tetraethylenepentamine.

11. A process according to claim 1 wherein when the promoter is an aminoacid it has 2 to 10 carbon atoms.

12. A process according to the claim 2, characterized in that the carbonating reaction is simutlaneous to the neutralization reaction and both take place in the presence of calcium oxide or hydroxide, the reaction temperature being 95°-98° C. and the reaction time being 4 to 10 hours.

13. The product prepared by the process of claim 1.

* * * * *